Patented Dec. 12, 1922.

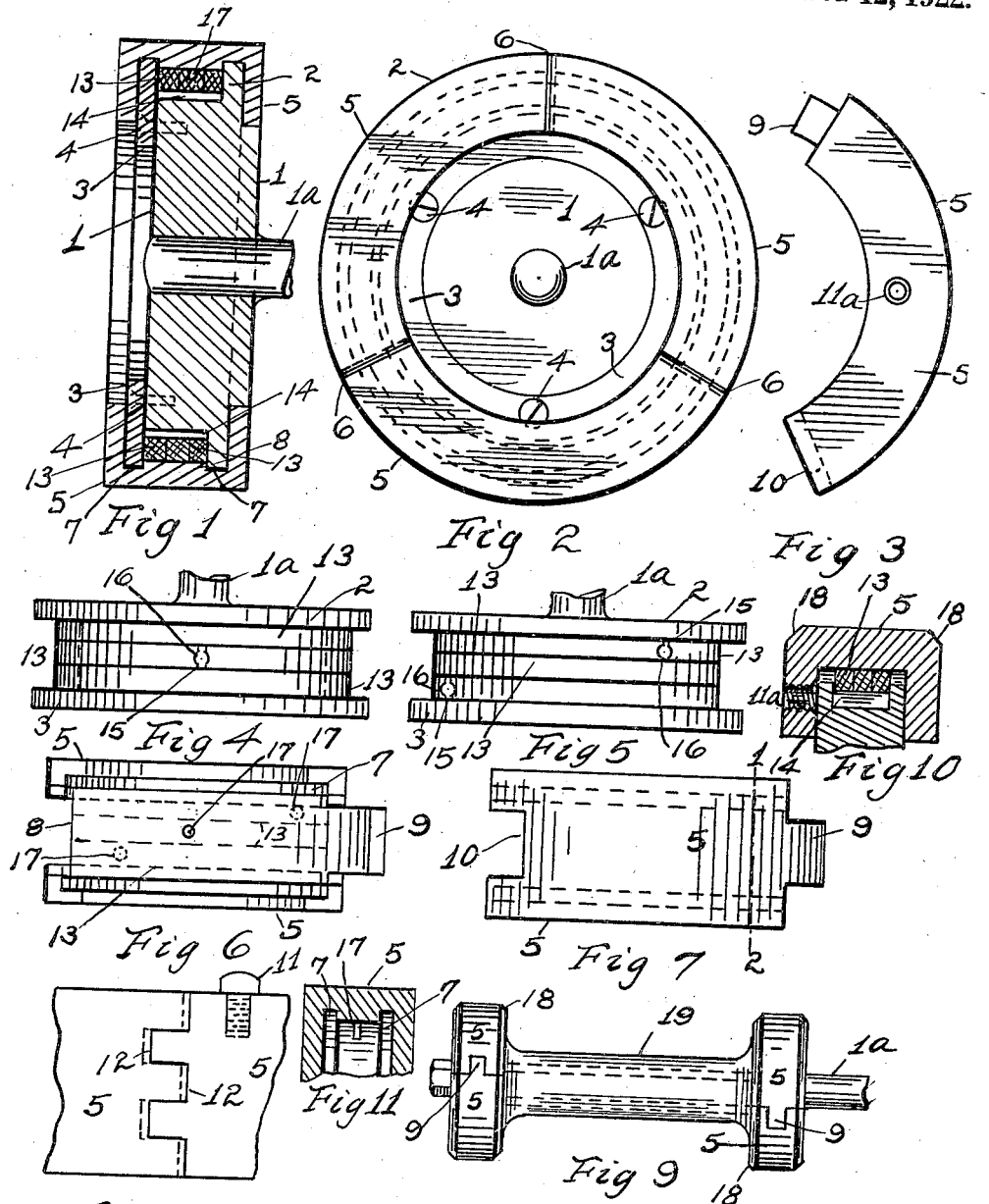

1,438,760

UNITED STATES PATENT OFFICE.

NATHANIEL G. HOLLAND, OF NORFOLK, VIRGINIA.

PISTON AND VALVE.

Application filed May 24, 1922. Serial No. 563,352.

*To all whom it may concern:*

Be it known that I, NATHANIEL G. HOLLAND, a citizen of the United States, residing at Norfolk, in the county of Norfolk and State of Virginia, have invented certain new and useful Improvements in Pistons and Valves, of which the following is a specification.

My invention relates to devices adapted to be used as valves or pistons for steam engines and pumps.

The object of the invention is to provide a steam tight piston or valve which takes the place of a solid ring valve or piston and possesses the quality of not allowing the steam to leak by it.

A further object is to provide a device which is self adjusting, simple in construction and in which the packing will last for several years.

Further objects and advantages will be more fully described herein and specifically pointed out in the claims hereunto annexed recourse being had to the accompanying drawing forming a part of this specification in which:

Figure 1 is a sectional view of my device which may be used either for a piston of a steam engine or pump or as a valve by which the fluid may be controlled to and from the cylinder in the ordinary manner.

Figure 2 is a back view of the piston or valve.

Figure 3 is an elevation of one of the circular arcs or segments detached from the core or centre of the device.

Figure 4 is an edge view showing the packing or snap rings in place and surrounding the centre or core casting of the piston or valve.

Figure 5 is a view similar to Figure 4 but with the piston or valve turned around a part of a revolution upon its axis to show the opposite parts of the packing or snap rings when in staggered relation with each other.

Figure 6 is an inside view of one of the outer segments or enclosing arcs which form the bearing surface upon the inner diameter of the cylinder, pump or valve chest.

Figure 7 is a plan of one of the segments showing a tongue and groove interlocking joint for connection with other segments to form a complete circle to form a valve or piston.

Figure 8 is a plan of a modified mortise and tenon or interfitting joint used on very wide valves or pistons.

Figure 9 is a view of two valves or pistons joined together by a connecting sleeve when used as a piston valve for inside admission of steam to the cylinder.

Figure 10 is a cross section of one of the segments or arcs taken on the line 1—2 in Figure 7 but without the grooves upon the inner circumference.

Figure 11 is a cross section of one of the segments shown in Figure 1 before it is applied over the packing rings.

In the drawing like reference numerals indicate similar parts in all the several views:

My device consists of an aggregation of parts so arranged as to be readily adapted for either a piston or valve, the part 1 representing the core or centre which is suitably connected to the piston rod or valve stem $1^a$, as the case may be.

The supporting casting or centre 1 is turned or otherwise formed with the flange 2 on the outer portion of the centre core.

3 is a follower ring of the same thickness and diameter as the flange 2 and is secured to the core 1 at its back end by means of the countersunk screws 4 thus forming a circular space or groove for the hereinafter described packing rings and segments.

5 are segmental bearing members or arcs which traverse the inner surface of the steam cylinder, pump or valve chamber and fit over the flanges 2 and 3 with their ends nearly together, as at 6 in Figure 2, so that when they bear upon the packing rings the latter are compressed by them the edges of the segments or arcs are pressed together permitting the piston or valve to be inserted into the cylinder, therefore, their outward spring or resiliency insures a steam tight fit.

The inner portions of the segments or arcs 5 are provided with circumferential grooves or channels 7 for the reception of the out edges of the flanges 2 and 3 and form the inner bearing 8 for the outer surface of the packing or snap rings 13 and by the pressure exerted upon them by the part 8 prevents blowing of steam through the rings.

The segments or arcs are joined at their ends by the tongues 9 fitting into the notches 10.

In some cases I may fasten the segments to the flanges 2 and 3 by means of the set screws 11, (Figure 8), fitting in the threaded hole 11ª, (Figures 3 and 10), if desired.

In Figure 8, I show a double joint arrangement of the segments which I may use for very wide pistons or valves.

As shown in the sectional elevation of Figure 1, the packing or snap rings 13 are loose upon the core or centre 1 and are enclosed by the recess formed by the segments or arcs 5 and the periphery of the core and have a "floating" space between it and the under surface of the packing rings 13 in order to allow them to be compressed for a fit into the receptacle in which they are to be used.

As in ordinary practice, the packing or snap rings 13 are split, as at 15, Figures 4 and 5, forming a gap to permit the rings to close together when compressed.

I also provide small concave portions 16 which form a complete hole when the two edges of the rings come in contact and are for the purpose of engaging the small pins 17 affixed to the inner surface of the segments 5 by means of which the whole structure may be rotated when enclosed by the arcs or segments, yet, by the arrangement of the pins 17 therein, the joints of the packing rings 13 are kept from being opposite to each other by the staggered alignment of the pins when all the arcs or segments are in place which keeps the same tension on all the packing rings.

By this means, each packing ring is evenly compressed throughout the circumference of the valve or piston and also kept in proper relation with each other at all times.

As shown in Figures 1, 9 and 10, I show beveled edges or chamfers 18 upon the edges of the segments or arcs which I may use, particularly when my invention is adapted for valves, for instance, as shown in Figure 9, which view shows two of my complete devices joined together by a sleeve 19 forming a double or piston valve for inside admission of steam.

The core or centre 1 is loosely fitted to permit a lateral "floating" of the parts 1 and 5 allowing the piston rod or valve stem to be free at all times and accommodate themselves to the stuffing box and cylinder.

My invention effects a saving in fuel by keeping tight and thus preventing waste of steam.

I claim:

1. A device of the class described and in combination with a core or centre member, of packing snap rings therein arranged in staggered alignment, and locking segmental enclosing means adapted to compress said rings and maintain said staggered relation with each other.

2. A device as described and in combination with a flanged core or centre member, of a ring forming a second flange detachably secured thereto, packing or snap rings between said flanges arranged in staggered alignment, and segmental members covering said flanges adapted to hold said rings in proper staggered relation and for compressing the same.

3. A device of the class described and in combination with a centre casting or core, a flange thereon, of a follewer ring detachably mounted thereon, compressible packing rings between said flanges, a series of flanged circular arcs or segmental members adapted to cover said rings and flanges having maintaining means for keeping the packing rings in staggered relation with each other and for compressing the same.

4. A device as described and in combination with a centre core and its groove forming flanges, of compressible packing or snap rings in said groove having orifices at the split portion thereof, segmental members or arcs for enclosing the flanges and rings, and pins on said arcs adapted to hold said rings in staggered alignment and for compressing the same evenly around the circumference.

5. A device as described, a grooved centre having split and perforated packing snap rings thereon, of enclosing means for said rings consisting of segments or arcs having a tongue and groove connection between each other and having inner circumferential grooves form a flat raised bearing surface for the packing rings, pin means on said arcs for holding the packing rings in an overlapped or staggered relation with each other and for compressing the same evenly at every point of the circumference.

6. A device as described and in combination with a grooved centre or core, of packing rings in said groove arranged in staggered alignment, a series of flanged interlocking arcs or segments for enclosing the packing rings having inner circumferential grooves or channels above and below said interlocking joint means and forming bearing means for the outer surface of said packing rings, and pins upon the inner surface of said arcs for establishing a staggered or overlapping relation of said packing rings at all times and during the compression of the same by said arcs.

7. A device as described, a grooved casting or core, of packing rings thereon adapted to be rotated upon said core while in staggered relation with each other, flanged, grooved and inner bearing, radially jointed arcs or segments adapted to cover the packing and the said core groove and compress the former, and means carried by said arcs for maintaining said staggered alignment of the packing rings.

In testimony whereof I have hereunto affixed my signature in the presence of two witnesses.

NATHANIEL G. HOLLAND.

Witnesses:
GEO. A. BROUGHTON,
ALEX WARNER.